(12) United States Patent
Cho et al.

(10) Patent No.: US 8,866,996 B2
(45) Date of Patent: Oct. 21, 2014

(54) LIQUID CRYSTAL DISPLAY AND DRIVING METHOD THEREOF

(75) Inventors: Jin Hyun Cho, Seoul (KR); Young Jai Bai, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/327,139

(22) Filed: Dec. 15, 2011

(65) Prior Publication Data

US 2012/0154706 A1    Jun. 21, 2012

(30) Foreign Application Priority Data

Dec. 15, 2010    (KR) .................. 10-2010-0128027

(51) Int. Cl.
*G02F 1/133*    (2006.01)
*G09G 3/36*    (2006.01)
*G02F 1/1333*    (2006.01)

(52) U.S. Cl.
CPC .. *G02F 1/133382* (2013.01); *G09G 2320/0252* (2013.01); *G09G 3/3648* (2013.01); *G09G 2320/041* (2013.01); *Y10S 977/742* (2013.01); *Y10S 977/949* (2013.01)
USPC ............... 349/72; 349/58; 349/62; 977/742; 977/949

(58) Field of Classification Search
CPC .................................................. G09G 3/3696
USPC .................. 349/72, 58, 62; 977/742, 949
See application file for complete search history.

(56) References Cited

U.S. PATENT DOCUMENTS

| 5,384,069 | A | * | 1/1995 | Yoshinaga et al. | ........ 252/299.01 |
| 6,191,839 | B1 | * | 2/2001 | Briley et al. | .................. 349/161 |
| 6,727,468 | B1 | * | 4/2004 | Nemeth | ........................ 219/209 |
| 2006/0256581 | A1 | * | 11/2006 | Hwang et al. | ................. 362/619 |
| 2008/0165496 | A1 | * | 7/2008 | Kang et al. | .................... 361/692 |
| 2008/0291386 | A1 | * | 11/2008 | Dunn | ............................ 349/161 |
| 2009/0251397 | A1 | * | 10/2009 | Dunn | .............................. 345/87 |

FOREIGN PATENT DOCUMENTS

| JP | 02-311819 | | * 12/1990 | ............. G02F 1/133 |
| JP | 02-311819 | A | 12/1990 | |
| JP | 9-005712 | A | 1/1997 | |
| KR | 10-1996-0032047 | A | 9/1996 | |
| KR | 20-0349116 | Y1 | 4/2004 | |
| KR | 10-2007-0051396 | A | 5/2007 | |

(Continued)

OTHER PUBLICATIONS

Search Report issued Jul. 25, 2012 by the International Searching Authority in counterpart International Application No. PCT/KR2011/009604.

*Primary Examiner* — Edward Glick
*Assistant Examiner* — Sang V Nguyen
(74) *Attorney, Agent, or Firm* — Sughrue Mion, PLLC

(57) ABSTRACT

A liquid crystal display including: a liquid crystal display panel including a thin film transistor substrate and a liquid crystal layer disposed on the thin film transistor substrate; a heat generation unit that is configured to heat the liquid crystal layer; a resistance sensing unit that senses a change in a magnitude of resistance of the heat generation unit; a heat generation unit power controller that decreases a magnitude of power applied to the heat generation unit when the magnitude of resistance of the heat generation unit is equal to or greater than a reference magnitude of resistance; and a power supply unit that supplies power of a designated magnitude to the heat generation unit power controller.

24 Claims, 12 Drawing Sheets

(56) References Cited

FOREIGN PATENT DOCUMENTS

| KR | 10-2007-0068792 | * | 7/2007 | ............. G02F 1/133 |
| KR | 10-2007-0068792 A | | 7/2007 | |
| KR | 10-2010-0025111 | * | 3/2010 | ............ G02F 1/1345 |
| KR | 10-2010-0025111 A | | 3/2010 | |
| KR | 10-2010-0053351 | * | 5/2010 | ............... G09G 3/36 |
| KR | 10-2010-0053351 A | | 5/2010 | |

* cited by examiner

10

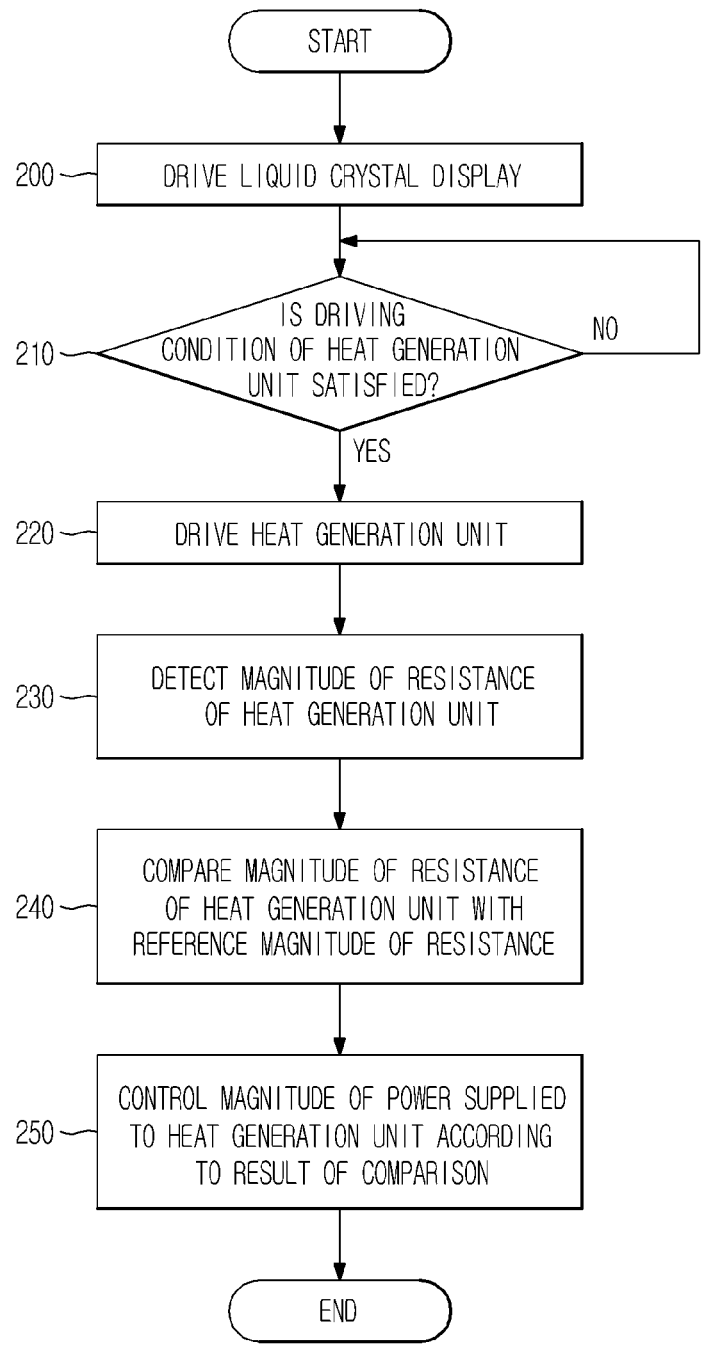

LIQUID CRYSTAL DISPLAY AND DRIVING METHOD THEREOF

CROSS-REFERENCE TO RELATED APPLICATION

This application claims priority from Korean Patent Application No. 2010-0128027, filed on Dec. 15, 2010 in the Korean Intellectual Property Office, the disclosure of which is herein incorporated by reference.

BACKGROUND

1. Field

Apparatuses and methods consistent with exemplary embodiments relate to a liquid crystal display with a heat generation unit to preheat a liquid crystal display panel and a driving method thereof.

2. Description of the Related Art

In general, a liquid crystal display operates according to an alignment of liquid crystals. Alignment of the liquid crystals is changed according to a voltage difference between pixel electrodes and a common electrode by light irradiated from a light source, and the liquid crystals having changed alignment adjust a transmission amount of light, thereby allowing a desired image to be displayed.

SUMMARY

Exemplary embodiments provide a liquid crystal display which allows liquid crystals to maintain a reference temperature or more so as to increase a light transmission amount adjusting ability and to achieve a rapid response speed of the liquid crystals, and a driving method thereof.

According to an aspect of an exemplary embodiment, there is provided a liquid crystal display, including a liquid crystal display panel including a thin film transistor substrate and a liquid crystal layer disposed on the thin film transistor substrate; a heat generation unit that is configured to heat the liquid crystal layer; a resistance sensing unit that senses a change in a magnitude of resistance of the heat generation unit; a heat generation unit power controller that decreases a magnitude of power applied to the heat generation unit when the magnitude of resistance of the heat generation unit is equal to or greater than a reference magnitude of resistance; and a power supply unit that supplies power of a designated magnitude to the heat generation unit power controller.

The liquid crystal display may further include a backlight unit including a light source disposed a lower side of the liquid crystal display panel opposite to a display surface of the liquid crystal display panel and optical sheets that guide light irradiated from the light source to a surface of the liquid crystal display panel opposite to the display surface, and the heat generation unit may be provided between the liquid crystal display panel and the backlight unit.

The heat generation unit may be provided between the liquid crystal display panel and the optical sheets.

The heat generation unit may be in area contact with the liquid crystal panel and be formed by coating the liquid crystal panel or be provided as a sheet attached to the liquid crystal panel.

A glass substrate and a polarizing plate may be sequentially attached to the thin film transistor substrate and the heat generation unit may be provided between the glass substrate and the polarizing plate.

The heat generation unit may be in area contact with the glass substrate and the polarizing plate and be formed by coating the glass substrate or be provided as a sheet attached to the glass substrate.

An area of the heat generation unit may be equal to or smaller than an area of an active region of the liquid crystal display panel.

The heat generation unit may be a film made of a transparent material and provided with a thin film coated surface.

The heat generation unit may be a film formed by depositing carbon nanotubes (CNT) or indium tin oxide (ITO) in a thin thickness on a base film.

Electrodes may be attached to ends of the heat generation unit and the heat generation unit power controller may apply voltage to the electrodes such that current flows through the heat generation unit to generate heat.

A housing and a frame surrounding the housing may be provided on the liquid crystal display panel opposite to the display surface and the heat generation unit power controller may be provided between the housing and the frame.

According to another aspect of an exemplary embodiment, there is provided a driving method of a liquid crystal display, which includes a liquid crystal display panel including a liquid crystal layer disposed on the thin film transistor substrate, and a heat generation unit that is configured to uniformly heat the liquid crystal layer, the driving method including sensing a magnitude of resistance of the heat generation unit; comparing the magnitude of resistance of the heat generation unit with a reference magnitude of resistance so as to control temperature of the heat generation unit; and decreasing a magnitude of power applied to the heat generation unit when the magnitude of resistance of the heat generation unit is equal to or greater than a reference magnitude of resistance.

The heat generation unit may be a film formed by depositing carbon nanotubes (CNT) or indium tin oxide (ITO) in a thin thickness on a base film and the magnitude of resistance of the heat generation unit may be changed according to temperature.

The liquid crystal display further may include a heat generation unit power controller that applies power to the heat generation unit and the heat generation unit is electrically connected to the heat generation unit power controller.

BRIEF DESCRIPTION OF THE DRAWINGS

These and/or other aspects will become apparent and more readily appreciated from the following description of the exemplary embodiments, taken in conjunction with the accompanying drawings of which:

FIG. 9 is a flow chart illustrating a driving method of a liquid crystal display according to an exemplary embodiment.

DETAILED DESCRIPTION

Figure 1:
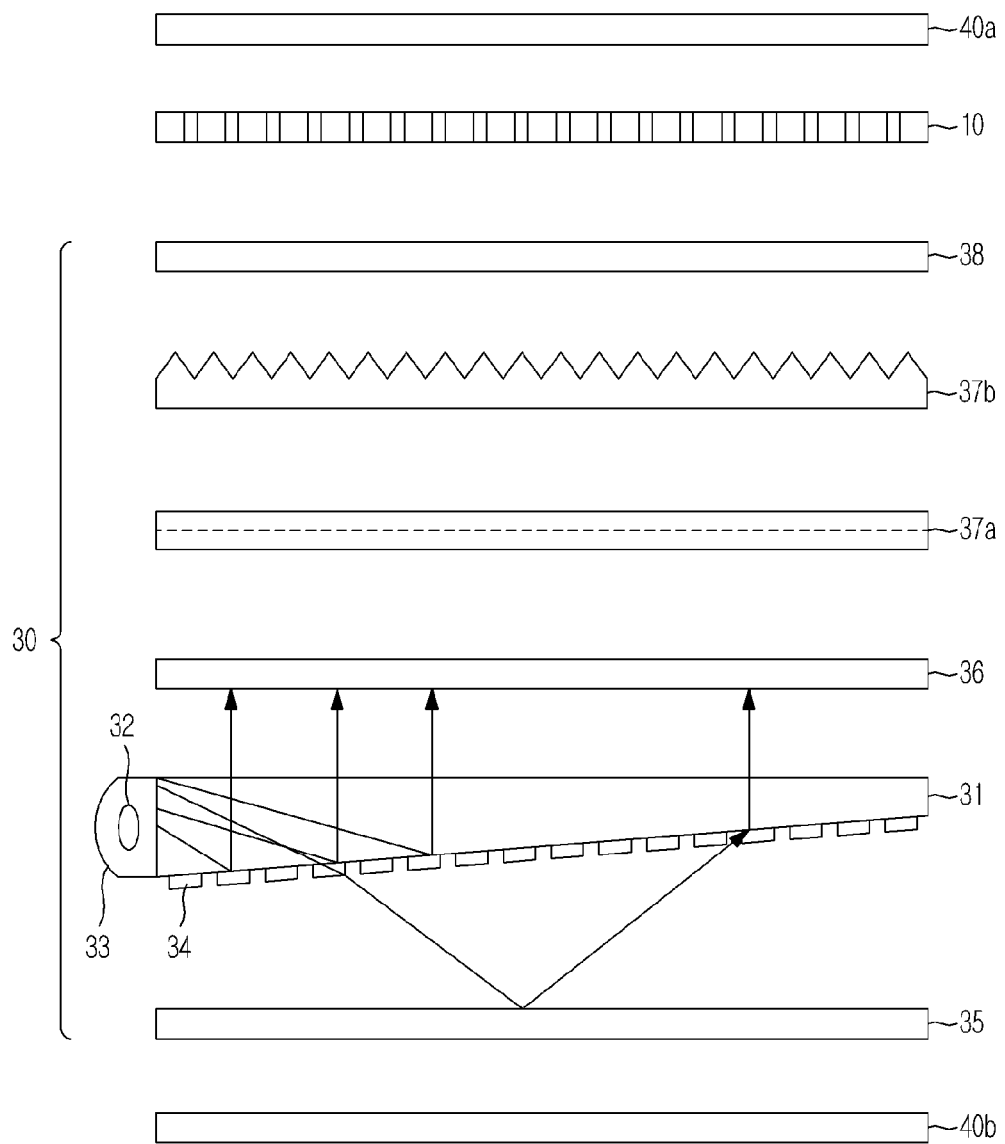
FIG. 1 is an exploded perspective view of a liquid crystal display including an edge type backlight unit according to an exemplary embodiment.

Reference will now be made in detail to the exemplary embodiments, examples of which are illustrated in the accompanying drawings, wherein like reference numerals refer to like elements throughout.

FIG. 1 is an exploded perspective view of a liquid crystal display including an edge type backlight unit according to an exemplary embodiment.

In general, liquid crystal displays are divided into a direct type and an edge type according to types of the backlight units that are used in the liquid crystal display. Hereinafter, an edge type liquid crystal display will be exemplarily described. However, the exemplary embodiments may also be applied to a direct type liquid crystal display.

The liquid crystal display includes a liquid crystal display panel 10 and a backlight unit 30.

The liquid crystal display panel 10 is a non-emitting device in which alignment of liquid crystals in a liquid crystal layer is adjusted to display images.

The backlight unit 30 supplies light to the liquid crystal display panel 10. Here, the backlight unit 30 is an edge type backlight unit. In the backlight unit 30, lamps 32 are provided at one side of a light guide plate 31 and a lamp housing 33 surrounding the lamps 32 causes light irradiated from the lamps 32 to proceed to the light guide plate 31.

The light guide plate 31 converts a line light source into a surface light source so as to allow the light irradiated from the lamps 32 to be incident upon an entire surface of the liquid crystal display panel 10. A plurality of dots 34 to diffuse light to form a uniform surface light source is provided on the lower surface of the light guide plate 31. The dots 34 are formed through a general printing method.

A reflective plate 35 to prevent light leakage is provided under the light guide plate 31.

In order to assure a viewing angle, a diffusion plate 36, two prism sheets 37a and 37b and a protective film 38 are sequentially disposed on the light guide plate 31. Hereinafter, the diffusion plate 36, the two prism sheets 37a and 37b and a protective film 38 are provided. The two prism sheets 37a and 37b are generally referred to as optical sheets.

The diffusion plate 36 includes a base plate and a coating layer formed in the form of beads on the base plate. The lamps 32 serve as a line light source and thus an alignment pattern thereof may be visible to a user. Therefore, the diffusion plate 36 serves to diffuse light from the light source so as to supply light having uniform brightness to the liquid crystal display panel 10. The diffusion plate 36 may be made of a resin, such as polymethyl methacrylate (PMMA) or methyl styrene (MS), or other like material. The diffusion plate 36 is not supported by the light guide plate 31 and thus has a considerable thickness in consideration of a strength of the diffusion plate 36. Generally, the diffusion plate 36 has a thickness of about 1 mm to about 2 mm.

Pyramidal prisms are formed in a designated alignment on the upper surfaces of the prism sheets 37a and 37b. Generally, two prism sheets 37a and 37b are used, and the microprisms formed on the respective prism sheets 37a and 37b form a designated angle. Most of the light having passed through the prism sheets 37a and 37b proceeds vertically, thereby providing a uniform brightness distribution.

The protective film 38 protects the prism sheets 37a and 37b, which are easily scratched.

A front housing 40a is provided on a display surface of the liquid crystal display panel 10. The front housing 40a is provided with an opening (not shown), and the screen of the liquid crystal display panel 10 is exposed to the outside through the opening.

A rear housing 40b is provided on the rear surface of the backlight unit 30. The rear housing 40b is made of a thermally conductive material, such as aluminum, electro-galvanized steel, copper, graphite or thermally conductive plastic or other similar material, thereby more easily dissipating heat generated by the lamps 32.

Figure 2:
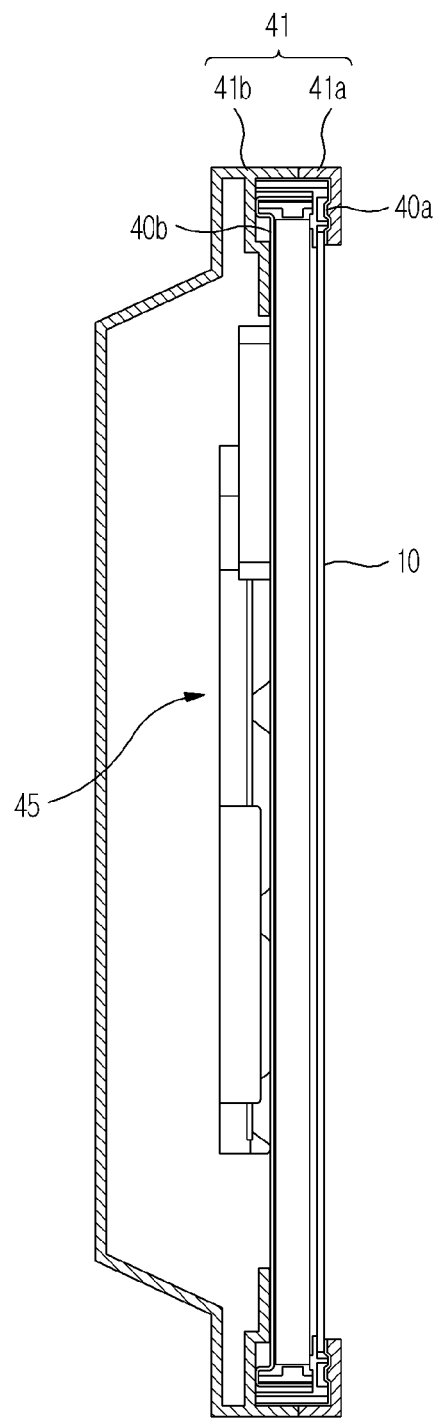
FIG. 2 is a cross-sectional view of the liquid crystal display of FIG. 1.

FIG. 2 is a cross-sectional view of the liquid crystal display of FIG. 1.

The liquid crystal display includes a frame 41. The frame 41 includes a front frame 41a to expose an effective display region of the liquid crystal display panel 10 to the outside and a rear frame 41b mounted on the rear surface of the liquid crystal display panel 10.

The front frame 41a is provided with an opening corresponding to the opening (not shown) of the front housing 40a of the liquid crystal display and the effective display region of the liquid crystal display panel 10 is exposed to the outside through the opening of the front frame 41a.

The rear frame 41b is made of a thermally or electrically conductive material, such as aluminum, electro-galvanized steel or copper or other similar material, and effectively interrupts electromagnetic waves generated due to driving of a heat generation unit power controller 140, which will be described later.

Figure 7:
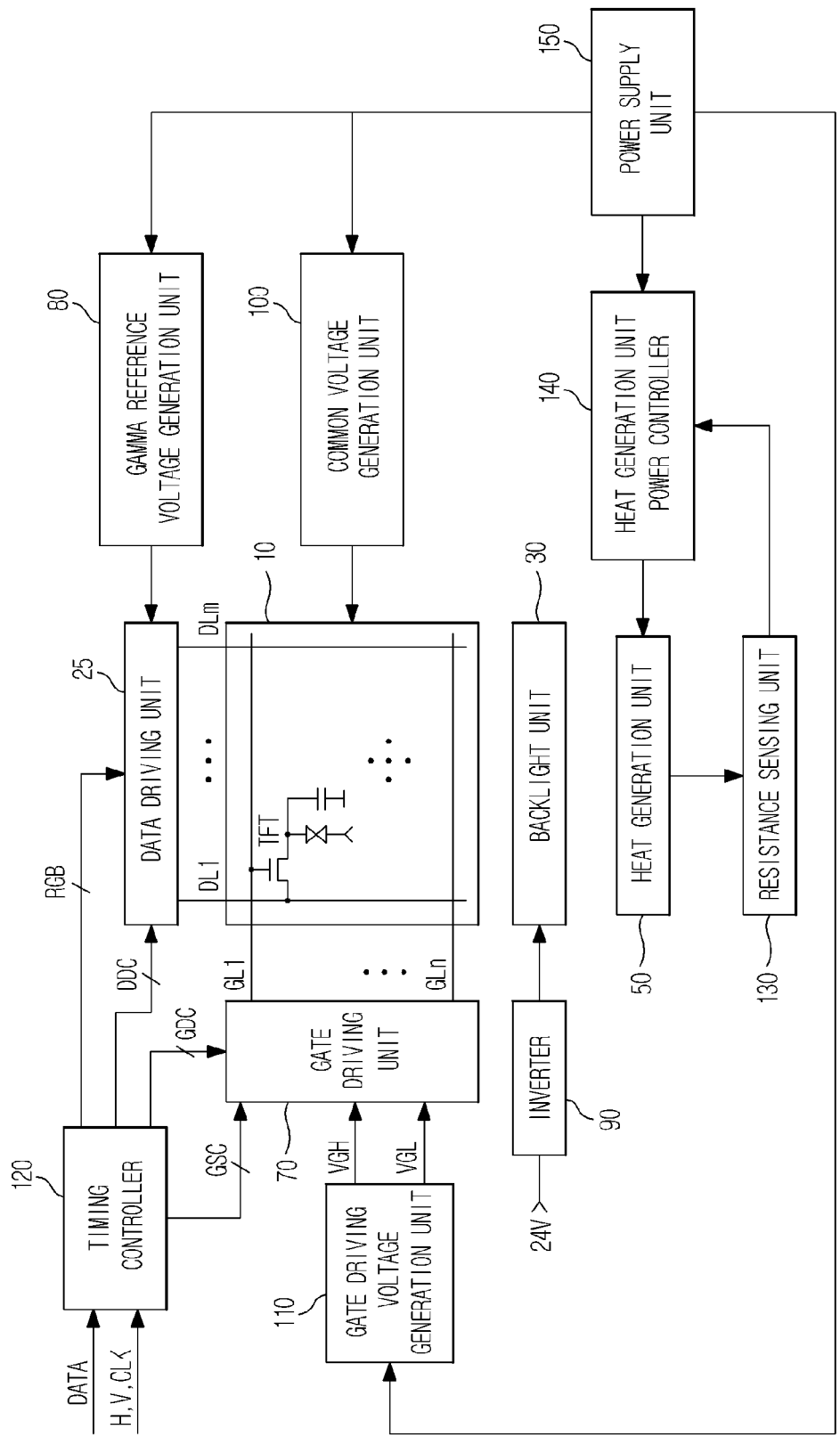
FIGS. 7 and 8 are control block diagrams of liquid crystal displays according to additional exemplary embodiments.

A circuit unit 45 is provided between the rear frame 41b and the rear housing 40b. As shown in FIGS. 2 and 7, the circuit unit 45 includes a power supply unit 150 (see FIG. 7) to control power supply, such as a switching-mode power supply (SMPS), an inverter 90, a heat generation unit power controller 140, a main control substrate to control operation of the liquid crystal display and a driving signal, and various electric elements and sensors, thereby driving and controlling the overall operation of the liquid crystal display. The electrical components of the circuit unit 45 will be described in more detail below with reference to FIG. 7.

Figure 3:
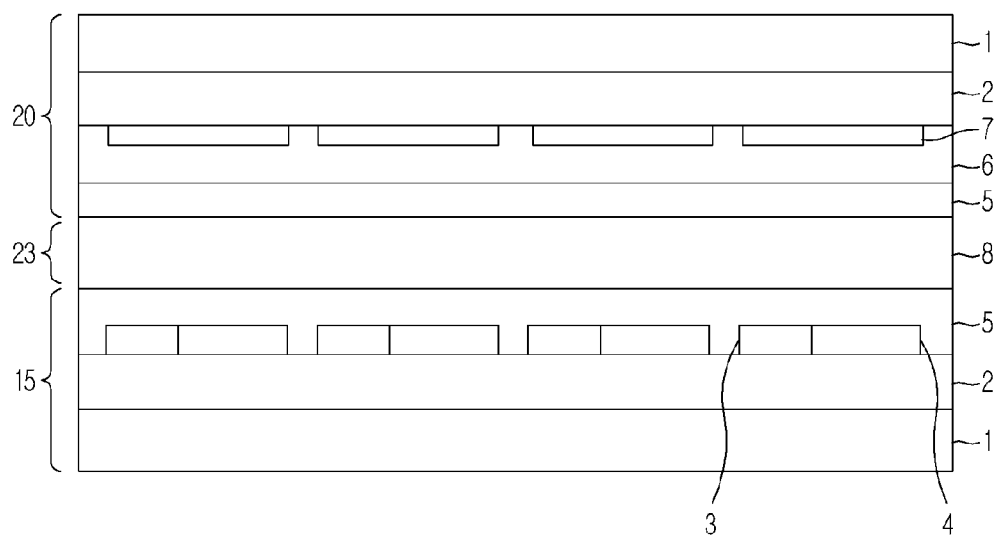
FIG. 3 is a view illustrating a structure of a liquid crystal display panel of the liquid crystal display of FIG. 1.

FIG. 3 is a view illustrating a structure of the liquid crystal display panel of the liquid crystal display of FIG. 1.

The liquid crystal display panel 10 includes a thin film transistor substrate 15 on which thin film transistors (TFTs) are formed, a color filter substrate 20 facing the thin film transistor substrate 15, and a liquid crystal layer 23 filling a gap between the substrates 15 and 20 when the substrates 15 and 20 are bonded to each other.

The thin film transistor substrate 15 includes TFTs 3 and pixel electrodes 4 made of indium tin oxide (ITO) at respective pixels, and the color filter substrate 20 includes R, G and B color filters 7 and a common electrode 6. The common electrode 6 is made of ITO. The color filters 7 are provided in a number that corresponds to a number of the pixel electrodes 4, and the color filters 7 are provided so as to correspond to the respective pixel electrodes 4. According to another embodiment of the present disclosure, the color filter substrate 20 may be omitted from the liquid crystal display panel 10. In this case, the liquid crystal layer 23 disposed on the thin film transistor substrate 15.

Alignment films 5 to align liquid crystals are formed on surfaces of the thin film transistor substrate 15 and the color filter substrate 20 facing each other, and the liquid crystal layer 23 is formed by injecting liquid crystals into a gap between the two alignment films 5. A space 8 is provided in the liquid crystal layer 23.

The space 8 is provided between the substrate 15 and the substrate 20 to maintain the gap between the thin film transistor substrate 15 and the color filter substrate 20.

Each of the thin film transistor substrate 15 and the color filter substrate 20 includes a glass substrate 2 and a polarizing plate 1.

Figure 4A:
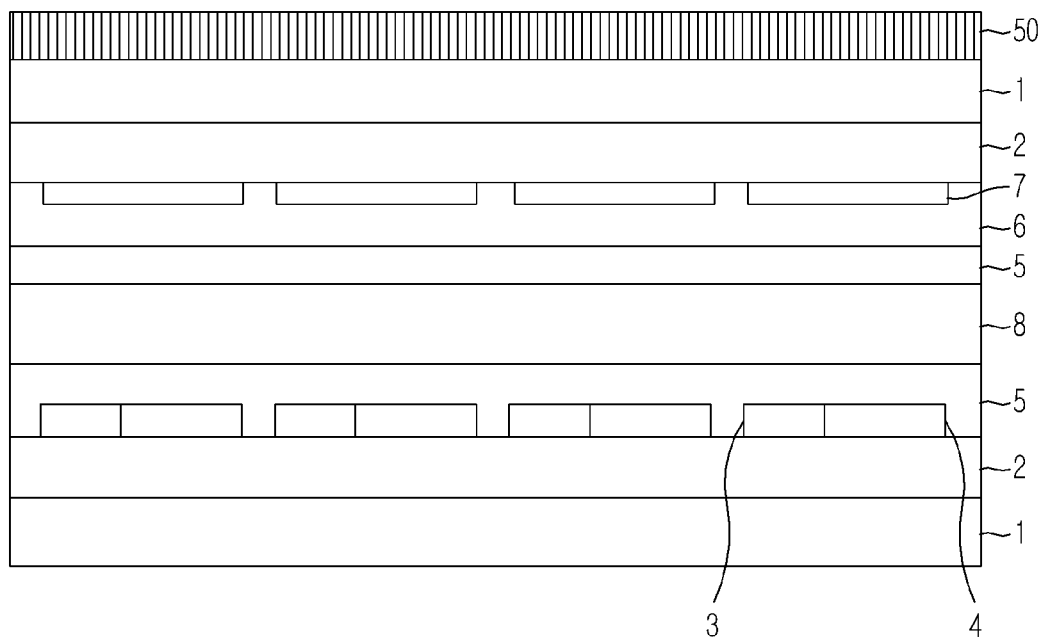
FIGS. 4A and 4B are views respectively illustrating a heat generation unit located on a front surface of a liquid crystal layer of a liquid crystal display according to an exemplary embodiment.
Figure 4B:
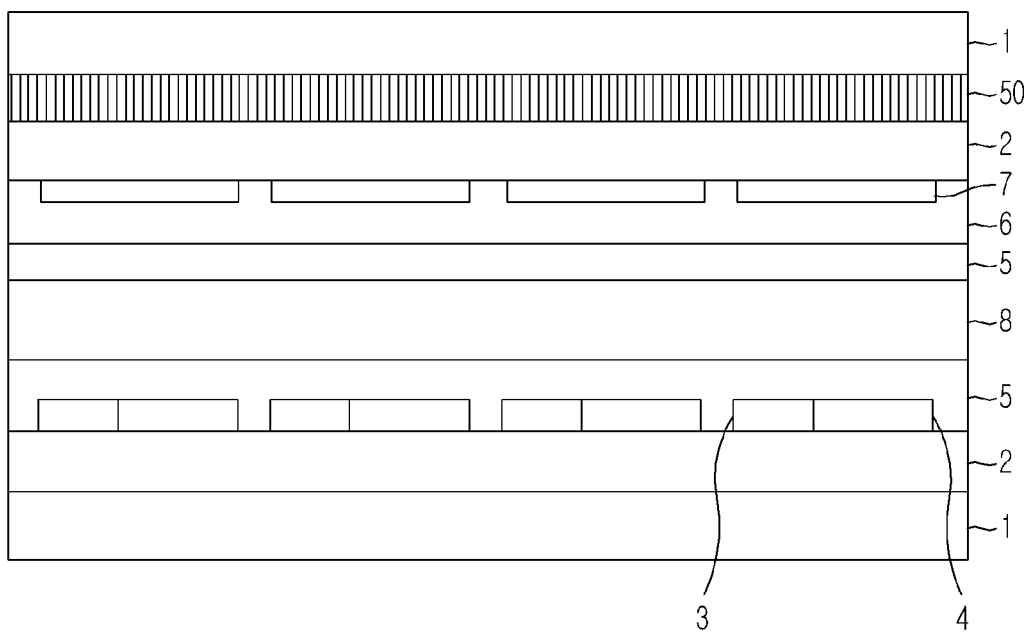

FIGS. 4A and 4B are views respectively illustrating a heat generation unit located on the front surface of a liquid crystal layer of a liquid crystal display according to an exemplary embodiment.

A heat generation unit 50 is provided on a surface, and dissipates heat so as to uniformly heat the liquid crystal display panel 10. A magnitude of resistance of the heat generation unit 50 increases or decreases according to temperature.

With reference to FIG. 4A, the heat generation unit 50 may be provided on the front surface of the liquid crystal display panel 10, i.e., the front surface of the display. The heat generation unit 50 may be provided between the liquid crystal display panel 10 and an upper chassis (not shown). The heat generation unit 50 dissipates heat so as to uniformly heat the liquid crystal layer 23.

With reference to FIG. 4B, the heat generation unit 50 alternatively may be located between the glass substrate 2 and the polarizing plate 1 of the color filter substrate 20 of the liquid crystal display panel 10 so as to uniformly heat the liquid crystal layer 23.

Figure 5A:
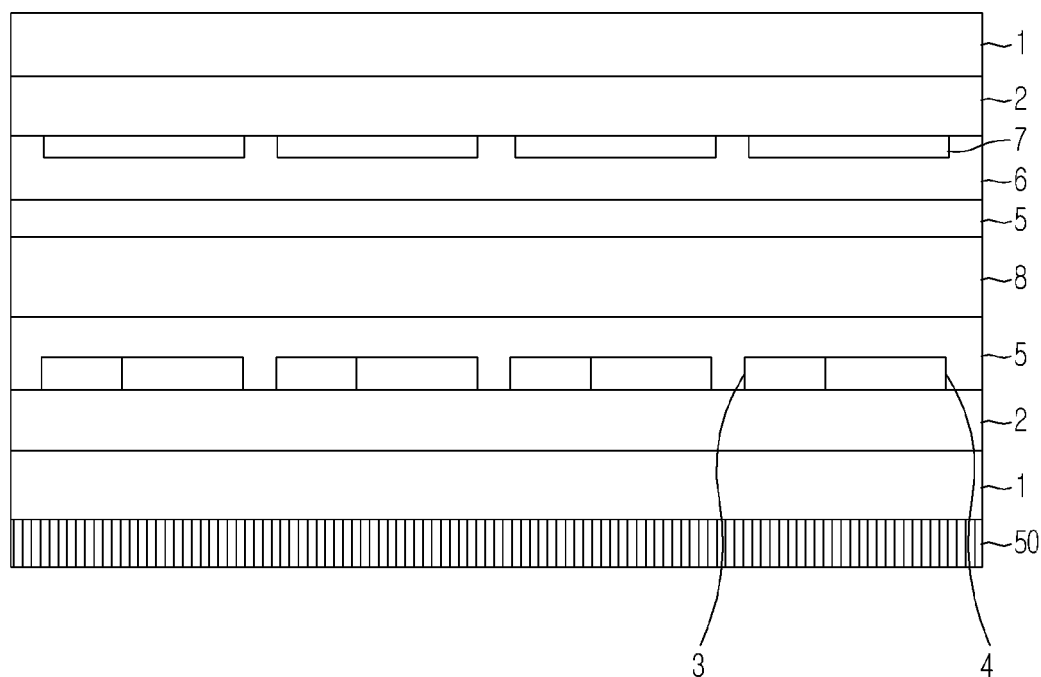
FIGS. 5A to 5B are views respectively illustrating a heat generation unit located on a rear surface of a liquid crystal layer of a liquid crystal display according to an exemplary embodiment.
Figure 5B:
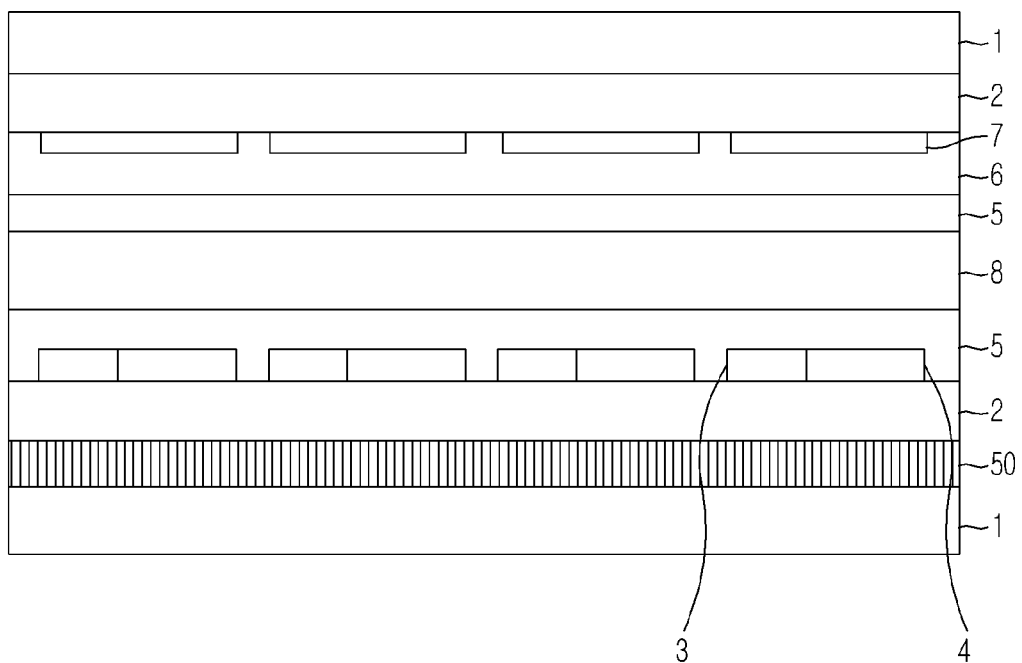

FIGS. 5A to 5B are views respectively illustrating a heat generation unit located on a rear surface of a liquid crystal layer of a liquid crystal display according to another exemplary embodiment.

With reference to FIG. 5A, the heat generation unit 50 may be provided alternatively on the rear surface of the liquid crystal display panel 10, i.e., the rear surface of the display. The heat generation unit 50 may be provided between the liquid crystal display panel 10 and the backlight unit 30.

With reference to FIG. 5B, the heat generation unit 50 alternatively may be located between the glass substrate 2 and the polarizing plate 1 of the thin film transistor substrate 15 of the liquid crystal display panel 10 so as to uniformly heat the liquid crystal layer 23.

Figure 5C:
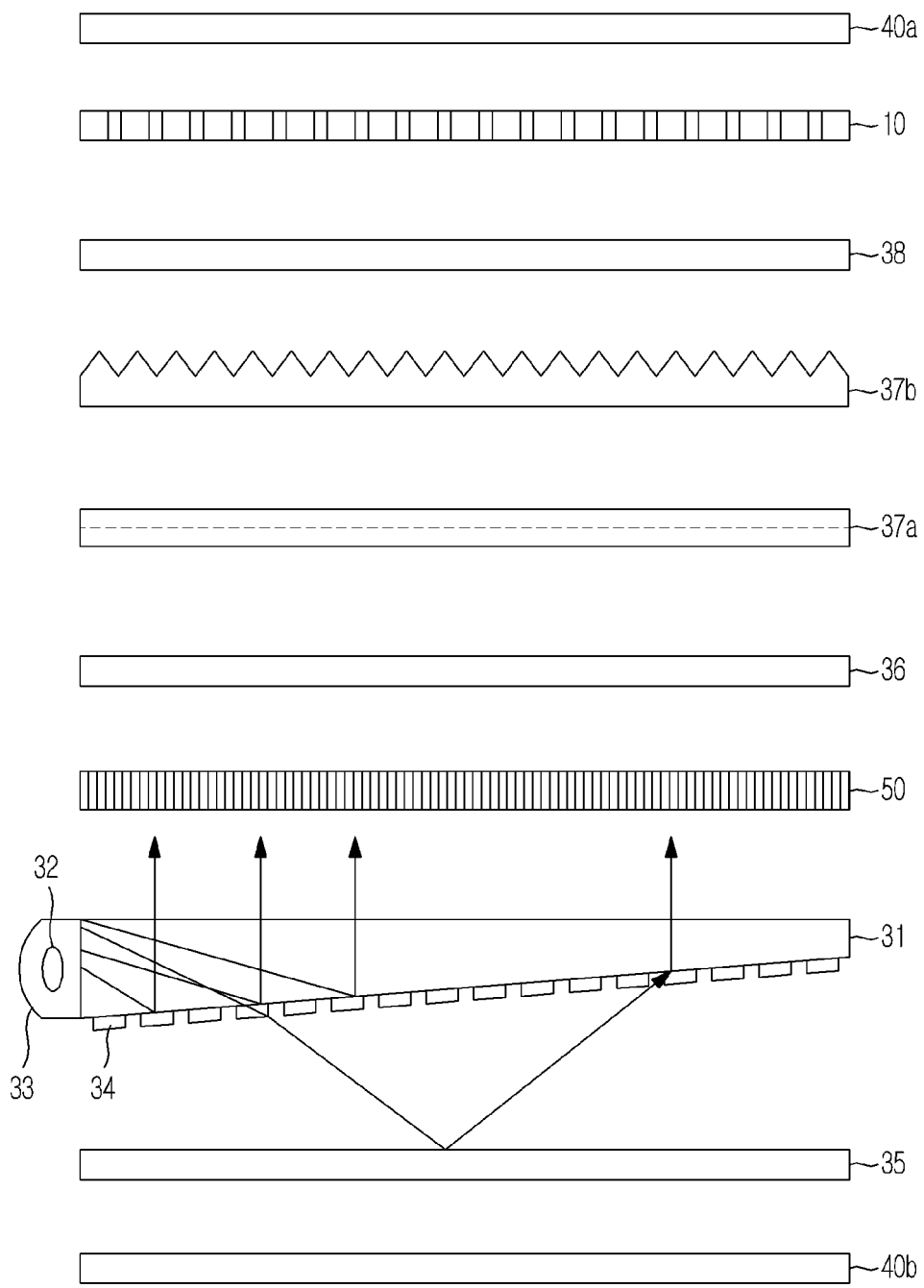
FIG. 5C is an exploded perspective view illustrating a heat generation unit 50 provided between a light guide plate and optical sheets of a backlight unit.

With reference to FIG. 5C, the heat generation unit 50 alternatively may be provided between the light guide plate 31 and the optical sheets of the backlight unit 30. Additionally, in some situations, it may be advantageous to form the heat generating unit in more than one location on the liquid display panel, for example on the front surface and the rear surface of the liquid crystal display panel.

Further, the heat generation unit 50 may be formed by coating or be prepared in the form of a separate sheet. The heat generation unit 50 has an area which is equal to or smaller than the area of an active region of the liquid crystal display panel 10. An active region of the liquid crystal display panel 10 denotes a driven region of the liquid crystal display panel 10 excluding an edge of the liquid crystal display panel 10 which is not driven. In the driven region of the liquid crystal display panel 10, the liquid crystal layer 23 is driven to contribute to display. Thus, an actual image is displayed in the driven region.

Figure 6:
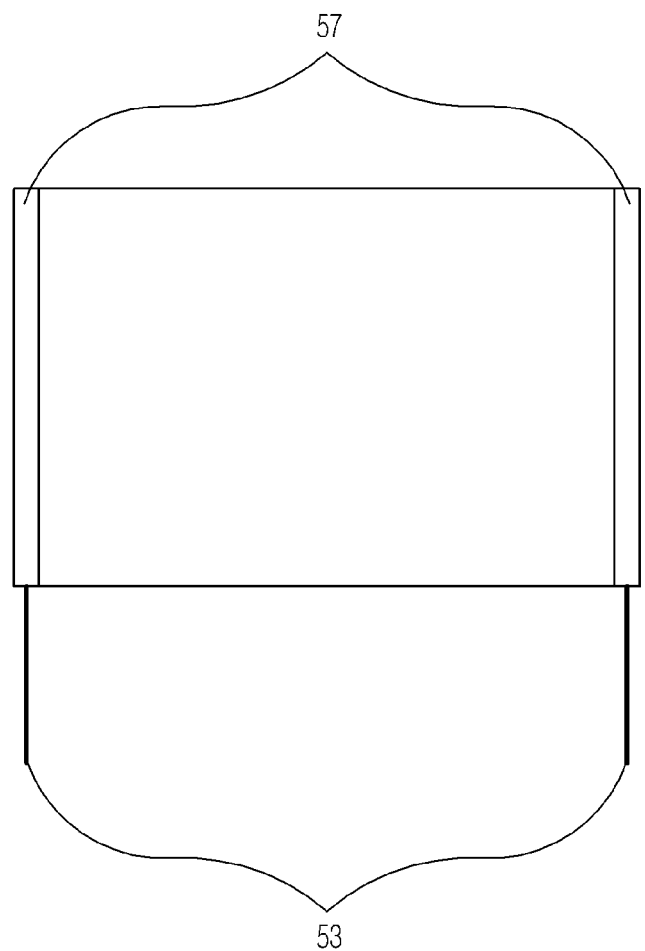
FIG. 6 is a view schematically illustrating a heat generation unit according to another exemplary embodiment.

FIG. 6 is a view schematically illustrating a heat generation unit according to an exemplary embodiment.

The heat generation unit 50 may be a film in which carbon nanotubes (CNT) or indium tin oxide (ITO), or similar material is deposited to a thin thickness on a base film (made of plastic or glass or the like). The CNT or ITO deposited to a thin thickness on the base film of the heat generation unit 50 is a conductor through which current flows.

Electrodes 57 are attached to both ends of the heat generation unit 50. A voltage difference between both ends of the heat generation unit 50 occurs due to the electrodes 57, and current flows through the heat generation unit 50 due to such a voltage difference. When current flows through the heat generation unit 50, heat is generated.

The heat generation unit 50 may be configured such that CNT or ITO is deposited in a thin thickness on the base film and the surface of the base film on which CNT or ITO is deposited is coated with a polymer so as to be electrically insulated. Alternatively, the heat generation unit 50 may be configured such that CNT or ITO is deposited in a thin thickness on one surface of the base film and the other surface of surface of the base film is coated with an insulator made of a polymer. One surface of the base film of the heat generation unit 50, i.e., the surface of the base film on which CNT or ITO is deposited may face the liquid crystal layer 23 so as to heat the liquid crystal layer 23.

Lead wires 53 are connected to the electrodes 57 of the heat generation unit 50, and are then connected to the heat generation unit power controller 140 which will be described later.

Various methods to transfer heat from the heat generation unit 50 to the liquid crystal layer 23, such as radiation, conduction and convection, may be used. The heat generation unit 50 transfers heat to the liquid crystal layer 23 through radiation in which the heat generation unit 50 emits heat energy through the surface thereof according to temperature, and the emitted heat energy is transferred to an object in the form of electromagnetic waves, through conduction in which, when the heat generation unit 50 is heated, molecules of the heat generation unit 50 rapidly move and movement of the molecules is shifted from a hot place to a cold place to transfer heat, and through convection in which the heat generation unit 50 is heated and thus a substance containing heat directly moves to transfer heat.

The heat generation unit 50 may be designed to operate whenever the liquid crystal display is operated, or be designed to operate only in a specific mode, for example, a 3D mode.

Figure 8:
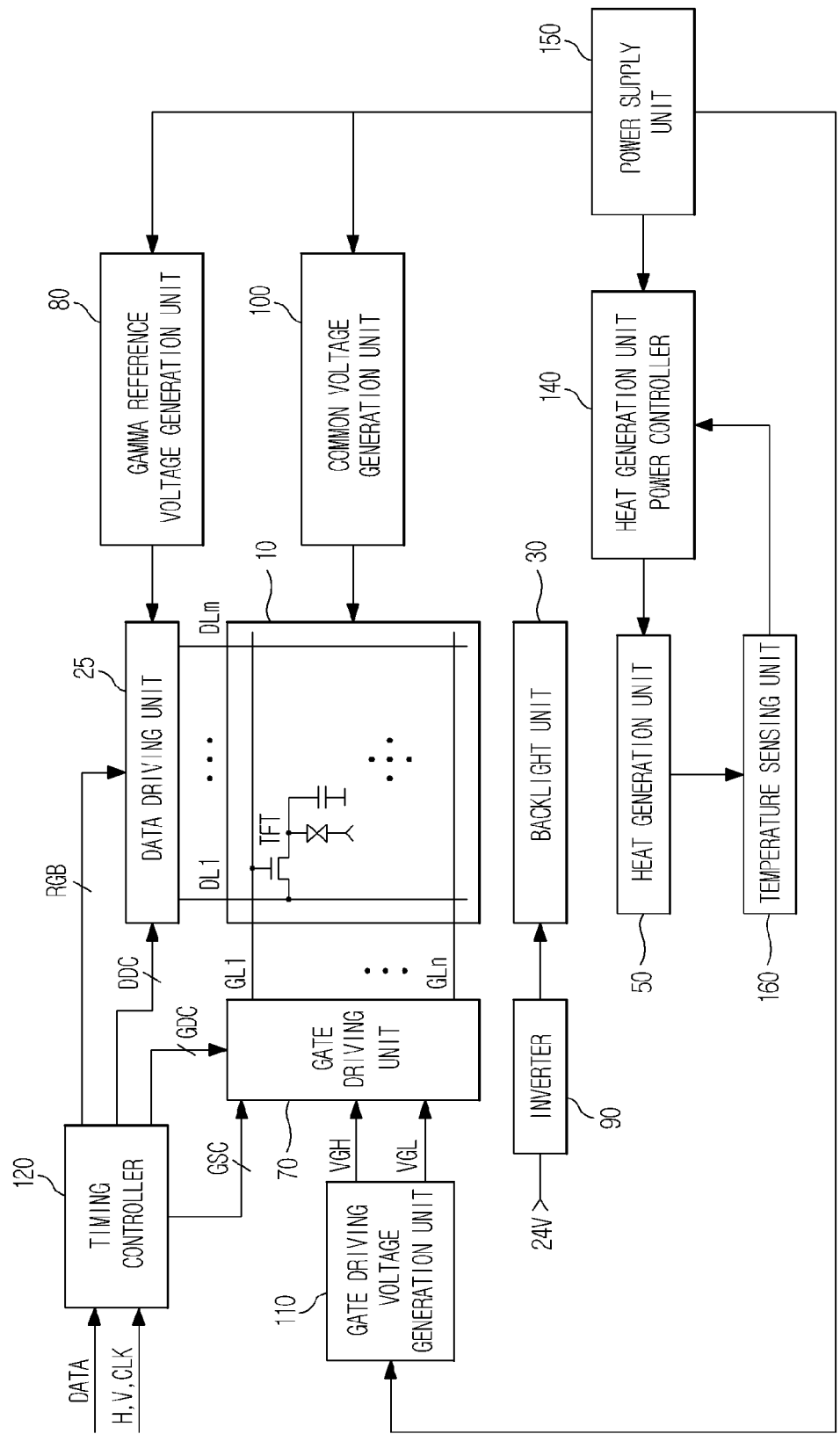

FIGS. 7 and 8 are control block diagrams of liquid crystal displays according to exemplary embodiments.

With reference to FIG. 7, a liquid crystal display 1 in accordance with an exemplary embodiment includes a liquid crystal display panel 10 on which data lines DL1 to DLm and gate lines GL1 to GLn intersect each other and thin film transistors (TFTs) to drive liquid crystal cells are formed at the intersections, a data driving unit 25 to supply data to the data lines DL1 to DLm of the liquid crystal display panel 10, a gate driving unit 70 to supply scan pulses to the gate lines GL1 to GLn of the liquid crystal display panel 10, a gamma reference voltage generation unit 80 to generate gamma reference voltage and to supply the gamma reference voltage to the data driving unit 25, a backlight unit 30 to irradiate light to the liquid crystal display panel 10, an inverter 90 to apply AC voltage and current to the backlight unit 30, a common voltage generation unit 100 to generate common voltage and supply the common voltage to a common electrode of the liquid crystal cells of the liquid crystal display panel 10, a gate driving voltage generation unit 110 to generate gate high voltage VGH and gate low voltage VGL and to supply the gate high voltage VGH and the gate low voltage VGL to the gate driving unit 70, and a timing controller 120 to control the data driving unit 25 and the gate driving unit 70.

The liquid crystal display 1 further includes a heat generation unit 50 to heat the liquid crystal display panel 10, a resistance sensing unit 130 to sense a resistance value of the heat generation unit 50, a heat generation unit power controller 140 to control a magnitude of power supplied to the heat generation unit 50 according to the resistance value sensed by the resistance sensing unit 130, and a power supply unit 150 to supply power of a designated magnitude to the heat generation unit power controller 140, the common voltage generation unit 100, the gamma reference voltage generation unit 80, and the gate driving voltage generation unit 110.

Liquid crystals are injected into a gap between two glass substrates of the liquid crystal display panel 10. The data lines DL1 to DLm and the gate lines GL1 to GLn intersect perpendicularly on the lower glass substrate of the liquid crystal display panel 10. The TFTs are formed at the intersections of the data lines DL1 to DLm and the gate lines GL1 to GLn. The TFTs supply the data on the data lines DL1 to DLm to the liquid crystal cells in response to the scan pulse. Gate electrodes of the TFTs are connected to the gate lines GL1 to GLn and source electrodes of the TFTs are connected to the data lines DL1 to DLm. Further, drain electrodes of the TFTs are connected to the pixel electrodes of the liquid crystal cells and storage capacitors.

TFTs are turned on in response to the scan pulses supplied to gate terminals via the gate lines GL1 to GLn. When the TFTs are turned on, video data on the data lines DL1 to DLm are supplied to the pixel electrodes of the liquid crystal cells.

The data driving unit 25 supplies data to the data lines DL1 to DLm in response to a data driving control signal DDC supplied from the timing controller 120. Further, the data driving unit 25 samples and latches a digital video data RGB supplied from the timing controller 120, converts the data into analog data voltage expressing grayscale in the liquid crystal cells of the liquid crystal display panel 10 based on the gamma reference voltage supplied from the gamma reference voltage generation unit 80, and supplies the analog data voltage to the data lines DL1 to DLm.

The gate driving unit 70 sequentially generates scan pulses, i.e., gate pulses, in response to a gate driving control signal GDC and a gate shift clock GSC supplied from the timing controller 120, and supplies the gate pulses to the gate lines GL1 to GLn. Here, the gate driving unit 70 determines high level voltage and low level voltage of each scan pulse according to the gate high voltage VGH and the gate low voltage VGL supplied from the gate driving voltage generation unit 110.

The gamma reference voltage generation unit 80 receives high power voltage which is the highest from among power voltages supplied to the liquid crystal display panel 10, generates positive gamma reference voltage and negative gamma reference voltage, and outputs the positive and negative gamma reference voltages to the data driving unit 25.

The backlight unit 30 is disposed on the rear surface of the liquid crystal display panel 10, emits light based on AC voltage and current supplied from the inverter 90, and irradiates the light to the respective pixels of the liquid crystal display panel 10.

The inverter 90 converts a square wave signal generated by the inside thereof into a triangular wave signal, compares the triangular wave signal with DC power voltage Vcc supplied from the system, and generates a burst dimming signal which is proportional to a result of the comparison. When the burst dimming signal determined according to the square wave signal generated by the inside of the inverter 90 is generated, a driving IC (not shown) in the inverter 90 to control generation of AC voltage and current controls generation of AC voltage and current supplied to the backlight unit 30 according to the burst dimming signal.

The common voltage generation unit 100 receives the high power voltage VDD, generates common voltage, and supplies the common voltage to the common electrode of the liquid crystal cells provided in the respective pixels of the liquid crystal display panel 10.

The gate driving voltage generation unit 110 receives the high power voltage VDD, generates gate high voltage VGH and gate low voltage VGL, and supplies the gate high voltage VGH and the gate low voltage VGL to the gate driving unit 70. Here, the gate driving voltage generation unit 110 generates the gate high voltage VGH which is more than threshold voltage of the TFTs provided in the respective pixels of the liquid crystal display panel 10, and generates the gate low voltage VGL which is not more than the threshold voltage of the TFTs. The generated gate high voltage VGH and gate low voltage VGL are used to determine high level voltage and low level voltage of each of the scan pulses generated by the gate driving unit 70.

The timing controller 120 supplies the digital video data RGB, supplied from a digital video card (not shown), to the data driving unit 25, generates the data driving control signal DDC and the gate driving control signal GDC using a horizontal/vertical synchronization signal H/V according to a clock signal CLK, and respectively supplies the data driving control signal DDC and the gate driving control signal GDC to the data driving unit 25 and the gate driving unit 70. Here, the data driving control signal DDC includes a source shift clock SSC, a source start pulse SSP, a polarity control signal POL and a source output enable signal SOE, and the gate driving control signal GDC includes a gate start pulse GSP and a gate output enable signal GOE.

Electrodes 51 are attached to both ends of the heat generation unit 50. When voltage is applied to the electrodes 51, a voltage difference between both ends of the heat generation unit 50 occurs. When the voltage difference between both ends of the heat generation unit 50 occurs, current flows through the heat generation unit 50. When current flows through the heat generation unit 50, heat is generated. When heat is generated by the heat generation unit 50, the liquid crystal display panel 10 is heated.

The resistance sensing unit 130 measures a magnitude of resistance of the heat generation unit 50. The magnitude of resistance of the heat generation unit 50 is changed according to temperature. When the temperature of the heat generation unit 50 is raised, the resistance of the heat generation unit 50 is increased, and when the temperature of the heat generation unit 50 is lowered, the resistance of the heat generation unit 50 is decreased.

The resistance sensing unit 130 includes a circuit to sense current and voltage. The resistance sensing unit 130 senses voltage applied to the electrodes 51 at both ends of the heat generation unit 50 and current flowing between the electrodes 51, thereby calculating the magnitude of resistance based on Ohm's law.

The heat generation unit power controller 140 controls a magnitude of power supplied to the heat generation unit 50 according to the magnitude of the resistance of the heat generation unit 50 transmitted from the resistance sensing unit 130. The heat generation unit power controller 140 includes a circuit to compare the magnitude of the resistance of the heat generation unit 50 with a reference magnitude of resistance.

The heat generation unit power controller 140 judges that the temperature of the heat generation unit 50 is higher than reference temperature and decreases the magnitude of power supplied to the heat generation unit 50, when the magnitude of the resistance of the heat generation unit 50 is equal to or greater than the reference magnitude of resistance. On the other hand, the heat generation unit power controller 140 judges that the temperature of the heat generation unit 50 is higher than the reference temperature and maintains or increases the magnitude of power supplied to the heat generation unit 50, when the magnitude of the resistance of the heat generation unit 50 is less than the reference magnitude of resistance.

The power supply unit 150 may be a switching-mode power supply (SMPS). The power supply unit 150 receives commercial power, converts the received commercial power into power of a designated magnitude, and then supplies the converted power to the heat generation unit power controller 140. The power supply unit 150 may convert the commercial power into power of various magnitudes, such as 1.8 v, 3 v, 5 v, and so on. Here, power of 1.8 v denotes AC power having an effective value of 1.8 v.

With reference to FIG. 8, a liquid crystal display 1 is provided according to another exemplary embodiment. In this exemplary embodiment, a temperature sensing unit 160 is used instead of the resistance sensing unit 130.

As shown in FIG. 8, the liquid crystal display 1 includes a liquid crystal display panel 10 on which data lines DL1 to DLm and gate lines GL1 to GLn intersect each other and thin film transistors (TFTs) to drive liquid crystal cells are formed at the intersections, a data driving unit 25 to supply data to the data lines DL1 to DLm of the liquid crystal display panel 10, a gate driving unit 70 to supply scan pulses to the gate lines GL1 to GLn of the liquid crystal display panel 10, a gamma reference voltage generation unit 80 to generate gamma reference voltage and to supply the gamma reference voltage to the data driving unit 25, a backlight unit 30 to irradiate light to the liquid crystal display panel 10, an inverter 90 to apply AC voltage and current to the backlight unit 30, a common voltage generation unit 100 to generate common voltage and to supply the common voltage to a common electrode of the liquid crystal cells of the liquid crystal display panel 10, a gate driving voltage generation unit 110 to generate gate high voltage VGH and gate low voltage VGL and to supply the gate high voltage VGH and the gate low voltage VGL to the gate driving unit 70, and a timing controller 120 to control the data driving unit 25 and the gate driving unit 70.

The liquid crystal display 1 further includes a heat generation unit 50 to heat the liquid crystal display panel 10, a temperature sensing unit 160 to measure a resistance value of the heat generation unit 50 so as to sense temperature of the heat generation unit 50, a heat generation unit power controller 140 to control a magnitude of power supplied to the heat generation unit 50 according to the temperature sensed by the temperature sensing unit 160, and a power supply unit 150 to supply power of a designated magnitude to the heat generation unit power controller 140.

Since the liquid crystal display 1 in the exemplary embodiment of FIG. 8 is the same as the liquid crystal display 1 in the exemplary embodiment of FIG. 7 except that the resistance sensing unit 130 of FIG. 7 is replaced with the temperature sensing unit 160 of FIG. 8, the components of the liquid crystal display 1 of FIG. 8 except for the heat generation unit power controller 140 to control temperature data transmitted from the temperature sensing unit 160 are given in advance in FIG. 3A and a detailed description thereof will thus be omitted.

The temperature sensing unit 160 senses temperature of the heat generation unit 50. The temperature sensing unit 160 senses the temperature of the heat generation unit 50 by sensing a magnitude of resistance of the heat generation unit 50. The temperature sensing unit 160 stores temperatures in advance according to magnitudes of resistance of the heat generation unit 50. The temperature sensing unit 160 includes a circuit to measure voltage applied to electrodes installed at the heat generation unit 50 and current flowing between the electrodes. The temperature sensing unit 160 calculates a magnitude of resistance by applying Ohm's law to the measured voltage and current. The temperature sensing unit 160 calculates temperature corresponding to the calculated magnitude of resistance and transmits data regarding the calculated temperature to the heat generation unit power controller 140.

The temperature sensing unit 160 may sense temperature of the heat generation unit 50 by directly measuring the temperature. In this case, a temperature sensor is installed at the heat generation unit 150 so as to calculate the temperature of the heat generation unit 50.

The heat generation unit power controller 140 controls a magnitude of power applied to the heat generation unit 50 according to temperature data transmitted from the temperature sensing unit 160. The heat generation unit power controller 140 compares the temperature transmitted from the temperature sensing unit 160 with reference temperature, and controls a magnitude of power applied to the heat generation unit 50 according to a result of the comparison. The heat generation unit power controller 140 decreases the magnitude of power applied to the heat generation unit 50, when the temperature transmitted from the temperature sensing unit 160 exceeds the reference temperature. On the other hand, the heat generation unit power controller 140 maintains or increases the magnitude of power applied to the heat generation unit 50, when the temperature transmitted from the temperature sensing unit 160 is below the reference temperature.

The heat generation unit power controller 140 may include a circuit to convert power supplied from the power supply unit 150 into power of a designated magnitude. The heat generation unit power controller 140 may include a switching circuit to apply or interrupt power supplied from the power supply unit 150. The heat generation unit power controller 140 may include a switching circuit to convert power supplied from the power supply unit 150 into power of a designated magnitude and to apply or interrupt of the converted power. The heat generation unit power controller 140 controls the switching circuit, thereby controlling time taken to apply power to the heat generation unit 50 or to interrupt the power applied to the heat generation unit 50.

FIG. 9 is a flow chart illustrating a driving method of a liquid crystal display according to an exemplary embodiment.

In operation 200, the liquid crystal display is driven. The heat generation unit power controller 140 confirms whether or not a driving condition of the heat generation unit 50 is satisfied (operation 210) when the liquid crystal display is driven. The driving condition of the heat generation unit 50 is set experimentally, and a plurality of driving conditions of the heat generation unit 50 may be prepared. For example, the driving condition of the heat generation unit 50 may be satisfied if the liquid crystal display is driven, or the driving condition of the heat generation unit 50 may be satisfied if the liquid crystal display is in a 3D mode (operation 200 and operation 210).

The heat generation unit power controller 140 drives the heat generation unit 50 when the driving condition of the heat generation unit 50 is satisfied (operation 220). Driving of the heat generation unit 50 denotes application of power to the heat generation unit 50 to generate heat. The heat generation unit 50 is provided as a surface heating element to uniformly heat the liquid crystal layer 23. Uniform heating of the liquid crystal layer 23 by the heat generation unit 50 denotes heat transfer to minimize or eliminate temperature variation among regions of the liquid crystal layer 23. Here, uniform denotes equal or almost similar. That is, heat generated by the heat generation unit 50 is transmitted to the liquid crystal layer 23 so that the temperature variation among the regions of the liquid crystal layer 23 of the liquid crystal display panel 10 is minimized or eliminated (operation 220).

The heat generation unit power controller 140 detects a magnitude of resistance of the heat generation unit 50 (operation 230) after driving of the heat generation unit 50. Alternatively, a magnitude of the temperature may be detected. The magnitude of the measured resistance is then compared with a reference magnitude in operation 240, and controls the magnitude of the power supplied to the heat generation unit according to the result of the comparison in operation 250. The heat generation unit power controller 140 includes a circuit to compare the magnitude of resistance of the heat generation unit 50 with a reference magnitude of resistance. The heat generation unit power controller 140 judges that temperature of the heat generation unit 50 is higher than reference temperature and decreases a magnitude of power applied to the heat generation unit 50, when the magnitude of resistance of the heat generation unit 50 exceeds the reference magnitude of resistance. On the other hand, the heat generation unit power controller 140 judges that temperature of the heat generation unit 50 is lower than the reference temperature and maintains or increases the magnitude of power applied to the heat generation unit 50, when the magnitude of resistance of the heat generation unit 50 is below the reference magnitude of resistance.

As is apparent from the above description, a liquid crystal display in accordance one or more exemplary embodiments controls a magnitude of power applied to a heat generation unit according to a variation of resistance or temperature, thereby allowing liquid crystals to uniformly maintain a reference temperature or more.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A liquid crystal display comprising:
    a liquid crystal display panel comprising a thin film transistor substrate and a liquid crystal layer disposed on the thin film transistor substrate;
    a heat generation unit that is configured to heat the liquid crystal layer;
    a resistance sensing unit that senses a change in a magnitude of resistance of the heat generation unit;
    a heat generation unit power controller that decreases a magnitude of power applied to the heat generation unit when the magnitude of resistance of the heat generation unit is equal to or greater than a reference magnitude of resistance;
    a power supply unit that supplies power of a designated magnitude to the heat generation unit power controller; and
    a backlight unit comprising:
        a light source disposed at a lower side of the liquid crystal display panel opposite to a display surface of the liquid crystal display panel, wherein the light source is provided at one side of a light guide plate which converts a line light source into a surface light source so as to allow light irradiated from the light source to be incident upon an entire surface of the liquid crystal display panel; and
        optical sheets that guide the light irradiated from the light source to the surface of the liquid crystal display panel opposite to the display surface,
    wherein the heat generation unit is provided between the liquid crystal display panel and the backlight unit.

2. The liquid crystal display according to claim 1, wherein:
    a glass substrate and a polarizing plate are sequentially attached to the thin film transistor substrate; and
    the heat generation unit is provided between the glass substrate and the polarizing plate.

3. The liquid crystal display according to claim 1, further comprises:
    a color filter substrate;
    a glass substrate and a polarizing plate are sequentially attached to the color filter substrate; and
    the heat generation unit is provided between the glass substrate and the polarizing plate.

4. The liquid crystal display according to claim 1, wherein an area of the heat generation unit is equal to or smaller than an area of an active region of the liquid crystal display panel.

5. The liquid crystal display according to claim 1, wherein the heat generation unit is a film made of a transparent material and provided with a thin film coated surface.

6. The liquid crystal display according to claim 5, wherein the heat generation unit is a film formed by depositing carbon nanotubes or indium tin oxide in a thin thickness on a base film.

7. The liquid crystal display according to claim 1, wherein:
    electrodes are attached to ends of the heat generation unit; and
    the heat generation unit power controller applies voltage to the electrodes such that current flows through the heat generation unit to generate heat.

8. The liquid crystal display according to claim 1, wherein:
    a housing and a frame surrounding the housing are provided on the liquid crystal display panel opposite to the display surface; and
    the heat generation unit power controller is provided between the housing and the frame.

9. The liquid crystal display according to claim 1, wherein the heat generation unit power controller increases the magnitude of power applied to the heat generation unit when the magnitude of resistance is less than the reference magnitude of resistance.

10. The liquid crystal display according to claim 1, further comprises a color filter substrate and the liquid crystal layer interposed between the thin film transistor substrate and the color filter substrate.

11. A driving method of a liquid crystal display, which comprises a liquid crystal display panel, a liquid crystal layer disposed on the thin film transistor substrate, a heat generation unit that is configured to heat the liquid crystal layer, and a backlight unit, the driving method comprising:
    sensing a magnitude of resistance of the heat generation unit;
    comparing the magnitude of resistance of the heat generation unit with a reference magnitude of resistance so as to control temperature of the heat generation unit;

decreasing a magnitude of power applied to the heat generation unit when the magnitude of resistance of the heat generation unit is equal to or greater than a reference magnitude of resistance;

converting a line light source into a surface light source so as to allow light irradiated from a light source to be incident upon an entire surface of the liquid crystal display panel; and guiding the light irradiated from the light source to the surface of the liquid crystal display panel.

12. The driving method according to claim 11, wherein the heat generation unit is a film formed by depositing carbon nanotubes or indium tin oxide (ITO) in a thin thickness on a base film, and the magnitude of resistance of the heat generation unit is changed according to temperature.

13. The driving method according to claim 11, wherein:
the liquid crystal display further comprises a heat generation unit power controller that applies power to the heat generation unit; and
the heat generation unit is electrically connected to the heat generation unit power controller.

14. The driving method according to claim 11, further comprising:
increasing the magnitude of power applied to the heat generation unit when the magnitude of resistance is less than the reference magnitude of resistance.

15. The driving method according to claim 11, wherein:
the liquid crystal display further comprises a color filter substrate and the liquid crystal layer interposed between the thin film transistor substrate and the color filter substrate.

16. A liquid crystal display comprising:
a liquid crystal layer;
a heat generation unit that heats the liquid crystal layer;
a sensing unit that senses a magnitude of heat of the heat generation unit;
a heat generation unit power controller that controls a magnitude of power applied to the heat generation unit;
a power supply unit that supplies power of a designated magnitude to the heat generation unit power controller; and
a backlight unit comprising:
    a light source disposed at a lower side of the liquid crystal display panel opposite to a display surface of the liquid crystal display panel, wherein the light source is provided at one side of a light guide plate which converts a line light source into a surface light source so as to allow light irradiated from the light source to be incident upon an entire surface of the liquid crystal display panel; and
    optical sheets that guide the light irradiated from the light source to the surface of the liquid crystal display panel opposite to the display surface, wherein
the heat generation unit is provided between the liquid crystal display panel and the backlight unit,
the sensing unit senses a change in a magnitude of resistance of the heat generation unit, and
the heat generation unit power controller decreases the magnitude of power applied to the heat generation unit when the magnitude of resistance of the heat generation unit is equal to or greater than a reference value of the resistance.

17. The liquid crystal display according to claim 16, wherein the heat generation unit power controller increases the magnitude of power applied to the heat generation unit when the magnitude of resistance is less than the reference value of the resistance.

18. The liquid crystal display according to claim 16, wherein the sensing unit senses a change in temperature of the heat generation unit; and
the heat generation unit power controller decreases the magnitude of power applied to the heat generation unit when the temperature of the heat generation unit is equal to or greater than a reference value of the temperature.

19. The liquid crystal display according to claim 18, wherein the heat generation unit power controller increases the magnitude of power applied to the heat generation unit when the temperature of the heat generation unit is less than the reference value of the temperature.

20. The liquid crystal display according to claim 16, wherein the heat generation unit extends substantially over a surface of the liquid crystal layer.

21. The liquid crystal display according to claim 1, wherein the heat generation unit power controller is further configured to convert power supplied from the power supply unit into power of the designated magnitude by increasing and decreasing magnitude of power to provide uniform heating of the liquid crystal display panel.

22. The liquid crystal display according to claim 1, wherein the heat generation unit power controller comprises a switching circuit which is configured to perform applying power supplied from the power supply unit to the heat generation unit, and interrupting power supplied from the power supply unit to the heat generation unit to provide uniform heating of the liquid crystal display panel.

23. The liquid crystal display according to claim 1, wherein
the heat generation unit power controller is further configured to convert power supplied from the power supply unit into power of the designated magnitude by increasing and decreasing the power magnitude, and
the heat generation unit power comprises a switching circuit which is configured to one of apply the converted power of the designated magnitude to the heat generation unit, and interrupt the converted power of the designated magnitude applied to the heat generation unit.

24. The liquid crystal display according to claim 23, wherein the switching circuit is configured to control an amount of time for which to one of apply the converted power of the designated magnitude to the heat generation unit, and interrupt the converted power of the designated magnitude applied to the heat generation unit.

* * * * *